(12) United States Patent
Chown et al.

(10) Patent No.: US 7,526,205 B2
(45) Date of Patent: Apr. 28, 2009

(54) TRANSMISSION SYSTEM

(75) Inventors: Martin Chown, Essex (GB); Stuart Barnes, Essex (GB); Stephen M. Webb, Kent (GB); David C. Winterburn, Herts (GB)

(73) Assignee: Azea Networks Limited, Romford (GB)

( * ) Notice: Subject to any disclaimer, the term of this patent is extended or adjusted under 35 U.S.C. 154(b) by 633 days.

(21) Appl. No.: 10/510,751

(22) PCT Filed: Apr. 14, 2003

(86) PCT No.: PCT/GB03/01618

§ 371 (c)(1),
(2), (4) Date: May 11, 2005

(87) PCT Pub. No.: WO03/088542

PCT Pub. Date: Oct. 23, 2003

(65) Prior Publication Data

US 2005/0213966 A1     Sep. 29, 2005

(30) Foreign Application Priority Data

Apr. 12, 2002   (GB) .................................. 0208560.3
Dec. 17, 2002   (GB) .................................. 0229543.4

(51) Int. Cl.
   *H04J 14/02*   (2006.01)
(52) U.S. Cl. ................... 398/94; 398/34; 398/91
(58) Field of Classification Search ............... 398/27, 398/34, 38, 91, 94
See application file for complete search history.

(56) References Cited

U.S. PATENT DOCUMENTS

| 5,225,922 A | * | 7/1993 | Chraplyvy et al. ............. 398/94 |
| 5,969,840 A | * | 10/1999 | Roberts ........................ 398/32 |
| 6,219,162 B1 | | 4/2001 | Barnard et al. |
| 6,269,129 B1 | | 7/2001 | Rhee et al. |
| 6,433,904 B1 | * | 8/2002 | Swanson et al. ............... 398/91 |
| 2002/0054648 A1 | * | 5/2002 | Krummrich et al. ......... 375/295 |
| 2003/0099014 A1 | * | 5/2003 | Egner et al. ................. 359/124 |

FOREIGN PATENT DOCUMENTS

| EP | 0 675 620 A | 10/1995 |
| EP | 1 033 843 A | 9/2000 |
| EP | 1 191 726 A | 3/2002 |
| WO | WO 01 95549 A | 12/2001 |
| WO | WO-02/071670 A2 | 9/2002 |
| WO | WO-02/096003 A1 | 11/2002 |

OTHER PUBLICATIONS

Ming-Seng Kao et al., "A Product-Coded WDM Coding System", IEEE Transactions on Communications, vol. 44, No. 1, 1996, pp. 43-46.

* cited by examiner

*Primary Examiner*—Leslie Pascal
(74) *Attorney, Agent, or Firm*—Mayer & Williams PC

(57) ABSTRACT

A wavelength division multiplexing transmission system, the system comprising: a plurality of channels at different wavelengths, each channel comprising a transmitter, a receiver, and one or more amplifiers, the system further comprising an encoder for encoding data with a coding, and; a decoder for decoding transmitted data; prioritizing means for prioritizing the data on each channel; monitoring means for monitoring directly or indirectly, raw (uncorrected) bit errors on each channel; power adjusting means for, varying the power on a channel in response to the bit error rate.

13 Claims, 9 Drawing Sheets

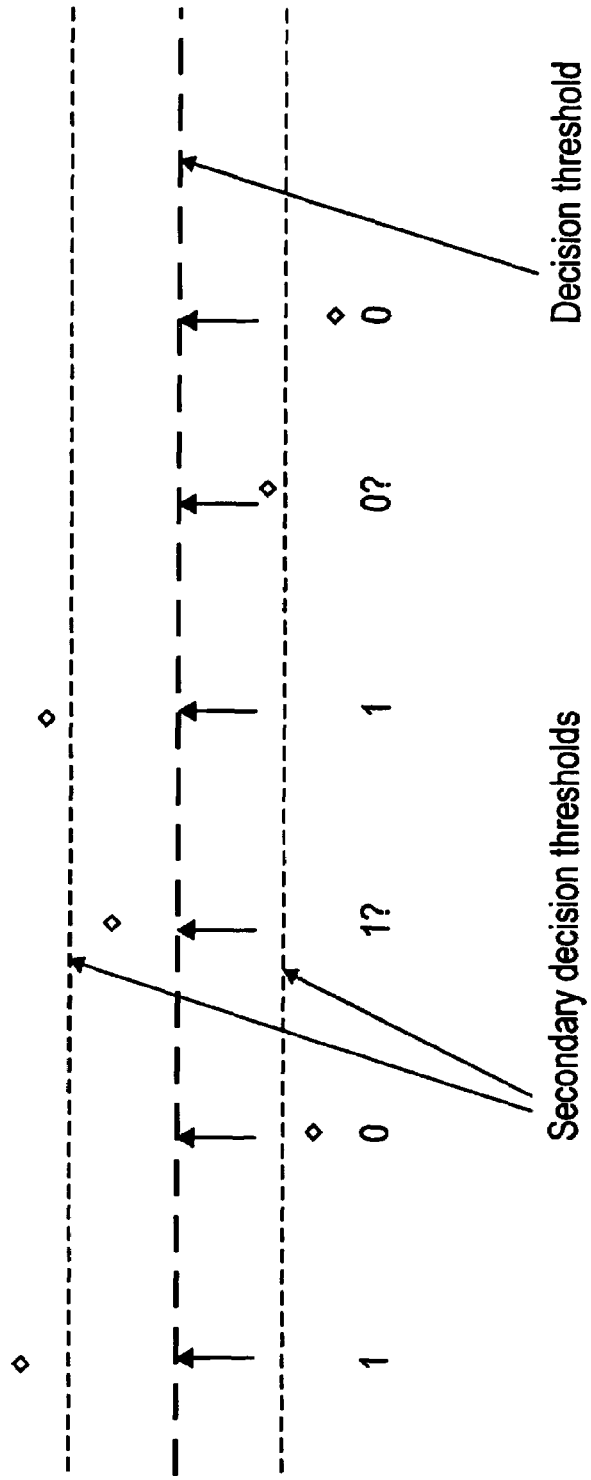

TRANSMISSION SYSTEM

This invention relates to a transmission system for transmitting data in digital format, and particularly, but not exclusively to a transmission system for transmitting signals over a long distance, for example, long haul dense wavelength division multiplexing (DWDM) systems such as those used in submarine systems. The invention also relates to long haul over land systems such as cross continental terrestrial systems.

A wavelength division multiplexing (WDM) system comprises a plurality of transmitters and receivers for transmitting data at different wavelengths or channels through the system, and generally a plurality of in-line amplifiers positioned at spaced apart intervals along the system for boosting the power of light being transmitted through the system. The amplifiers are typically rare earth doped amplifiers, and a part of the system between a transmitter and receiver is known as a link.

Generally, such WDM systems are installed by equipment vendors, and operators offering telecommunications services to customers who buy the systems from the equipment vendors.

To allow for ageing in the in line amplifiers and other components and to compensate for losses incurred in cable repairs, the operators build in significant levels of overall optical signal to noise ratio (OSNR) margin into the system at the outset. This in effect reduces the capacity of the link by as much as four times.

In addition, it is well know that when data is transmitted via a transmission system, errors may be introduced into the data due to noise in the system.

The longer the distance over which the data is transmitted, the more errors are likely to be introduced to the data.

Operators generally carry a mixture of classes of traffic through WDM line systems. These different classes of traffic are related to different service level agreements (SLAs). The highest revenue earning traffic will be referred to herein as A class traffic and comprises for example data from banks and other institutions which must be able to guarantee complete security and integrity of the data transmitted through the system. Such traffic is often provided on a fully protected basis in order to minimise outages that may occur when the system needs repairing.

The lowest class will be referred to herein as B class traffic and may comprise for example data from private individuals requiring access to the Internet. The B class traffic earns the least revenue and is often provided on a best efforts basis. In general, the volume of A class traffic will be significantly lower than lower tariff (B class) traffic.

It is known that rare earth doped amplifiers have different power capacities at different wavelengths. However, in recent years with the emergence of filtering techniques, such as Bragg Gratings, it is possible flatten the power capacity curve of rare earth doped amplifiers so that the gain for each separate wavelength is more or less equal. Despite this flattening, long systems still exhibit a notable lack of gain flatness and it is therefore necessary to pre-emphasise certain channels to ensure that each channel is nominally equivalent to each other channel. Pre-emphasis is achieved by putting more power into the poorer channels than the better channels. This means that at the receiver all channels appear equal.

In older transmission systems, where the level of gain flattening sophistication is lower, more attention to pre-emphasis is required to overcome significant levels of non-flatness.

When setting up a WDM link, it is necessary to calculate a power budget for the link. This is generally a co-operative process taking place between the equipment vendor and the operator. When working out the power budget, an ageing margin of several dBs will be set aside to compensate for cable repairs and system/component ageing. Damage to the system can be either permanent and caused by repairs or permanent deterioration in either the transmission medium or the in-line optical elements such as the transmitter receivers and amplifiers. Alternatively, damage may be transient. Polarisation Mode Dispersion (PMD) is a significant transient phenomena, being particularly deleterious at high transmission rates such as 10 Gbit/s and 40 Gbit/s.

The ageing margin is designed into the system at the outset. This exercise normally entails the generation of a power budget for a particular link, making an estimate of how the various elements will deteriorate over the lifetime of the system and building this into the link power budget. Due to the fact that transmission technologies are continually evolving it is difficult to make an estimate of these ageing elements. It is therefore common to take a very conservative position and it is not uncommon to build in an ageing margin of typically >5 dB on the most important links in the system such as long haul submarine links. This ageing margin can therefore be considered as 5 dB or more worth of lost power capacity throughout the lifetime of the system.

According to a first aspect of the present invention there is provided a wavelength division multiplexing transmission system, the system comprising;

a plurality of channels at different wavelengths, each channel comprising a transmitter, a receiver, and one or more amplifiers.

the system further comprising an encoder for encoding data with a coding, and;

a decoder for decoding transmitted data;

prioritising means for prioritising the data on each channel;

monitoring means for monitoring directly, or indirectly, raw (uncorrected) bit errors on each channel;

power adjusting means for varying the power on a channel in response to the bit error rate.

According to a second aspect of the present invention there is provided a method of managing data traffic transmitted via a wavelength division multiplexing transmission system, the method comprising the steps of:

allocating a priority to data to be transmitted;

directing data to a predetermined channel in the transmission system;

encoding the data prior to transmission using an encoder, and decoding the data after transmission using a decoder;

monitoring directly or indirectly raw (uncorrected) bit errors on each channel;

adjusting the power to each channel in response to the monitored bit error rate.

Preferably, the system comprises an FEC encoder and decoder.

Advantageously the monitoring means comprises a FEC error detection circuit.

Alternatively, the monitoring means comprises a multi-level soft decision circuit.

The monitoring means may comprise either a FEC error detection circuit, or a multi-level soft decision circuit, or both.

It is known to use error detection or correction code, particularly Forward Error Correction (FEC) coding in order to reduce or eliminate errors in the data. The use of such codes uses up available bandwidth in the channel that could otherwise be used for transmitting data.

In the present invention, adaptive techniques are used to avoid degradation of service in the event of a deteriorating signal quality. In the event of a deteriorating signal quality, it is important to have a significant leeway between the point where the deterioration is detectable and the point where adaptation is essential to avoid unacceptable degradation of service. There are several known techniques for detecting deterioration while the delivered bit error rate is still very low.

In systems using FEC, detection of raw errors is generally automatic within the system, so that, whenever the system corrects one or more errors, these are identified and can be counted. This means that, for a gradual deterioration, raw errors can be detected well before the onset of delivered errors (after error correction). Typically, this provides a leeway of several orders of magnitude between first detection and the point of unacceptable increase of delivered bit error rate. It should, however, be remembered that an order of magnitude in raw error rate can correspond to a fraction of a dB in signal to noise ratio; this means that it is necessary to ensure that the magnitude of the leeway is as large as possible.

Given one or more information sequences (in digital form) it is known to apply FEC in the following way: the source information, which may be thought of as a series of digital information words, is encoded into a code word, this being longer than the corresponding information word by the addition of coding overheads. This is transmitted over a communication channel with the possible injection of errors at the raw bit error rate (ber). After decoding, an estimate of the original code word is recovered, with the potential that the information source word and the recovered estimate are identical (error free), or else exhibit a significantly lower error rate than the raw ber. This is achieved at the expense of requiring a larger bandwidth because of the coding overhead, and this in turn increases the bandwidth carrying system penalties. The coding overhead can be separated and transmitted on a second channel, or it is possible to partition the code word in other ways and again carry the two parts of the code word on separate channels. In either case, the received sequences are re-combined before decoding.

In systems where FEC is not being used, it is possible to apply error-detection coding at much lower overhead than required for error correction. In such situations, however, a simpler solution is to add a parity bit to each block, because the block can be long to minimise the overhead, and error detection can be effected quite simply. Even though isolated errors can be detected, it is difficult to achieve adequate leeway between first error detection and the onset of unacceptable error rates. Without FEC, a bit error rate of $10^{-12}$ may be required, and therefore detection at a level of $10^{-15}$ or less is desirable. However, at a bit error rate of 10 Gb/s, this would correspond to a rate of one per day. The timescale for system changes could be much shorter than this. Therefore, even with perfect error detection, the measurement of very low error rates may be slow.

An alternative non-FEC solution that considerably speeds up the measurement of low error rates is to use multilevel (or soft) detection. In a multilevel soft decision circuit, a clock is provided to mark out regular decision instances, and at each instant a decision is made between a "1", corresponding, typically, to the signal voltage being greater than the predetermined threshold and a "0" which corresponds to a voltage less than the threshold. A multilevel decision circuit can provide additional information to distinguish between clear decisions (e.g. "1" corresponds to 1 volt for instance above threshold) and marginal decisions (e.g. "1?" corresponds to a signal above threshold but less than 1 volt). The onset of occasional "1?" or "0?" results will give an indication of reducing margins before a significant increase in actual errors. An example of this principle is shown in FIGS. 7 and 8.

When FEC is employed, multilevel detection is again applicable and advantageous. The leeway between first detection and unacceptable delivered error rates is widened through a two-stage effect. If the signal gradually deteriorates, the first indication is through the appearance of occasional "1?" or "0?" decisions while the raw bit error rate is still extremely low. Then, with further signal deterioration, the onset of a significant raw bit error rate can be tolerated still without significant delivered bit error rate—i.e. degradation of service. An additional advantage of employing multilevel detection in the presence of FEC is that the coding system can take advantage of the additional information in distinguishing between "1" and "1?" to increase the coding gain.

While four-level detection has been described by way of illustration, any number can be used.

It is advantageous to apply a mulit-level technique (such as the one just illustrated) in tandem with a direct measure of raw ber via error-detection. With a gradual onset of channel impairment, a detectable proportion of "1?" or "0?" signals would be received while the raw ber itself is still so low as to be undetectable within a useful timeframe. In this regime, it is possible to make an estimate of the underlying raw ber from a knowledge probability distributions of the received signals. With impairment a large proportion of the received signals is likely to be in the "1?" or "0?" bands and in this regime raw ber is more accurately estimated from error-detection. There is further scope for channel impairment before the raw ber reaches a level where effective error-correction breaks down and unacceptable delivered ber is reached. These two regimes together offer an effective margin between initial onset of a raw ber and the onset of delivered bit errors.

In addition to the above techniques that apply at the detection stage of a received signal, early warnings of the imminent onset of errors can come from a range of "health checks" at any part of the transmission system, such as monitoring the laser operating point and optical amplifier gain margins. These "health checks" could possibly be used to anticipate the risk of imminent impairment. The transmission system could then advantageously apply this information to prepare for the most effective form of response if and when the ber thresholds are reached, taking into account current traffic priorities.

It is known to design a transmission system so that the transmission channels will have some maximum acceptable raw ber ($ber_{max}$) such that with the operation of FEC, the end to end performance will meet pre-set quality criteria. Complex systems such as transoceanic optical fibre systems will inevitably include many variable components, and in the course of designing the system to tolerate these with minimum risk of failing to meet targets, there will typically be a significant margin between actual performance and minimum performance. For example, the raw ber will typically be some orders of magnitude below the ber that can be corrected for by the FEC. Moreover, this tolerance will typically be variable due to many variables such as optical polarisation effects such as Polarisation Mode Dispersion (PMD), Polarisation Dependent Loss (PDL) and Polarisation Dispersion Gain (PDG), temperature variation, fading and ageing.

Because a transmission system according to the present invention is able to react to increasing raw ber it is able to reduce power in channels carrying lower priority traffic if the raw ber exceeds the maximum acceptable raw ber ($ber_{max}$). Because of the ability to monitor and then react to increasing raw ber, a transmission system according to the present invention is able to operate within a margin that conventional systems have had to work below, since conventional systems are not able to cope with increasing raw ber. By means of the present invention therefore more traffic is able to be carried on the transmission system since lower priority traffic will be dropped if necessary in order to maintain the raw ber within acceptable limits.

Further, by means of the present invention it is possible to adapt to the changing quality of transmission on two or more channels so as to maximise the amount of traffic that can be carried. In the case of deterioration below design targets, it is possible to minimise the loss of service. Conversely it is possible to harness the otherwise unused tolerance margins by transmitting more traffic. It is to be understood that in maximising the amount of traffic care must be taken not to adversely effect the quality of the transmission.

If bit error rate on a particular channel increases, it is possible to reduce this ber by increasing the power on a channel. However, it will not be possible to continually increase the power on a system, as to do so would mean exceeding the power budget.

Because the nature of the data carried out on such systems can be generally divided between A class traffic and B class traffic, as described above, it is possible to prioritise data being transmitted on the system.

If necessary, it is therefore possible to withdraw traffic from a channel carrying low priority (B) traffic in order to reduce the bit error rate of the high priority traffic, since a lower level of traffic leads to a lower bit error rate. This improvement can be effected by closing down the channel, and transferring power that had been used by that channel to a channel carrying high priority (A) data without exceeding the power budget of the system. Alternatively the channel carrying (B) traffic can be kept open, and the capacity freed up by withdrawal of traffic can be applied to a re-optimised FEC configuration, for example, by letting it carry additional FEC overheads from one or more high priority channels, as described in our co-pending UK patent application No. 0208560.3, the contents of which are incorporated herein by reference, and from which this application claims priority.

By means of the present invention therefore, it is possible to ensure that channels carrying the A class traffic are allocated sufficient power to ensure the acceptable bit error rate is not exceeded. As the amount of A traffic is almost always very much less than the amount of other traffic, it should always be possible to manage the power in this way. In addition, the channels carrying high priority data will be positively biased using pre-emphasis. This ensures that if a system deteriorates suddenly the channels will survive in a physical sense.

An important feature of the present invention is that the detection facility of the FEC function may be used to maintain the relationship between A class channels and the remaining traffic over a long period of time and to pro-actively switch off the lower class of channels in the event of a severe transience on the line or a permanent step change. Under such circumstances the channels may be switched off permanently.

Preferably, the power adjusting means reduces power to channels carrying low priority data such that, if appropriate a channel carrying low priority data is switched off.

This has the effect of reducing traffic and power to the system.

Alternatively, the power adjusting means may increase the power to the system. This can be particularly appropriate if the system is running at a power much less than the maximum power available to it. The maximum available power is determined by the power budget of the system.

Advantageously, the system further comprises a controller for controlling the power adjusting means.

Advantageously, the data carried by the transmission system is encoded with FEC coding.

Conveniently, the power adjusting means is further adapted to additionally switch off a channel.

Preferably, the system further comprises means for pre-emphasising a channel prior to transmission of data.

The invention will now be further described by way of example only with reference to the accompanying drawings in which:

FIGS. 7 and 8 are graphical representations of a 4 level decision circuit.

Figure 1:
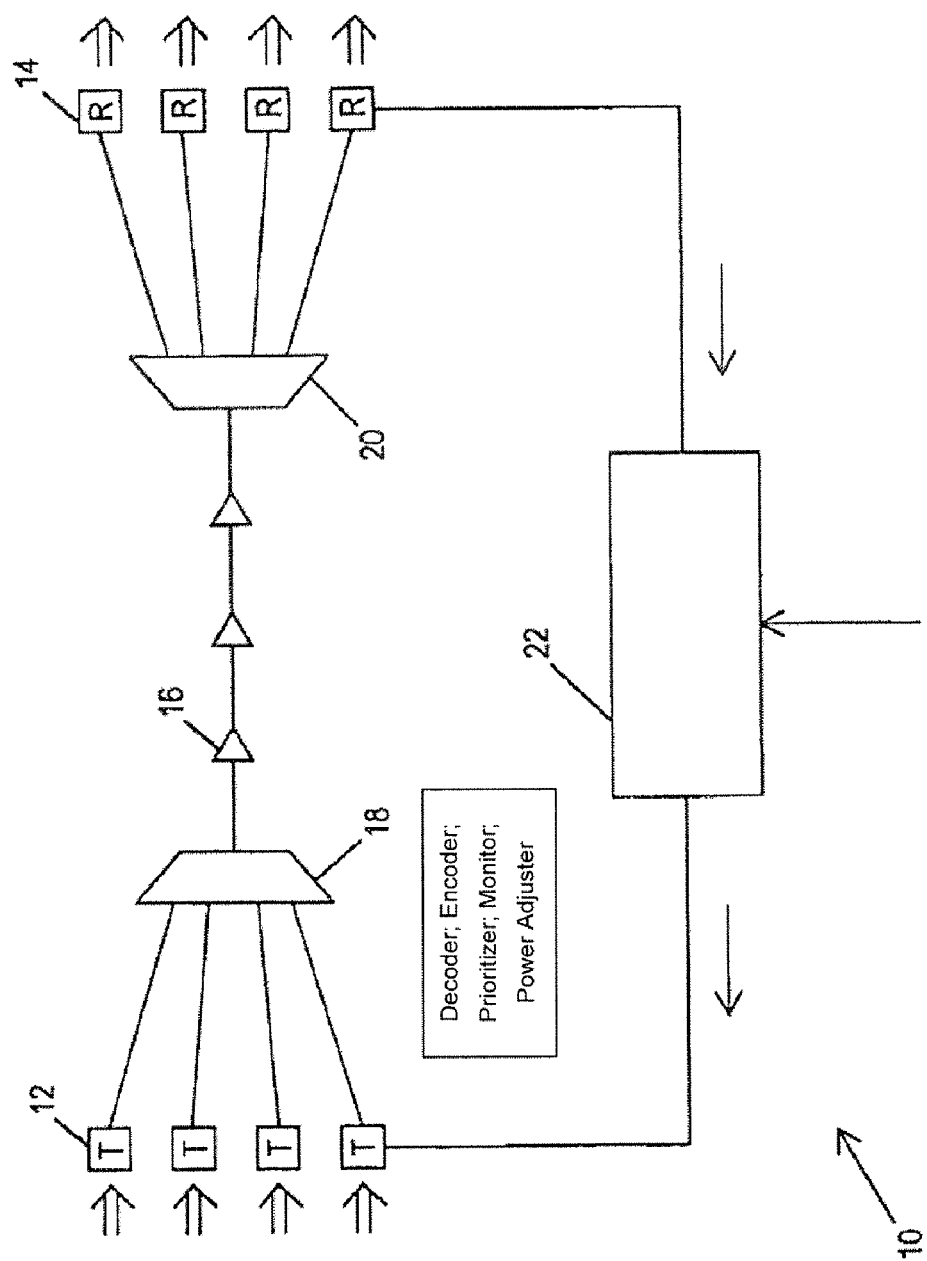
FIG. 1 is a schematic representation of a transmission system according to a first aspect of the present invention.

Referring to the figures, a transmission system according to the present invention is designated generally by the reference numeral 10 (FIG. 1).

The transmission system comprises a plurality of transmitters 12, and plurality of receivers 14. In the illustrated embodiment of the invention there are four transmitters and four receivers to define four channels along which data can be transmitted. However, it is to be understood that the invention applies to transmission systems having any number of channels and therefore any number of transmitters and receivers. The system 10 further comprises inline amplifiers 16, a multiplexer 18 and a demultiplexer 20.

Figure 2A:
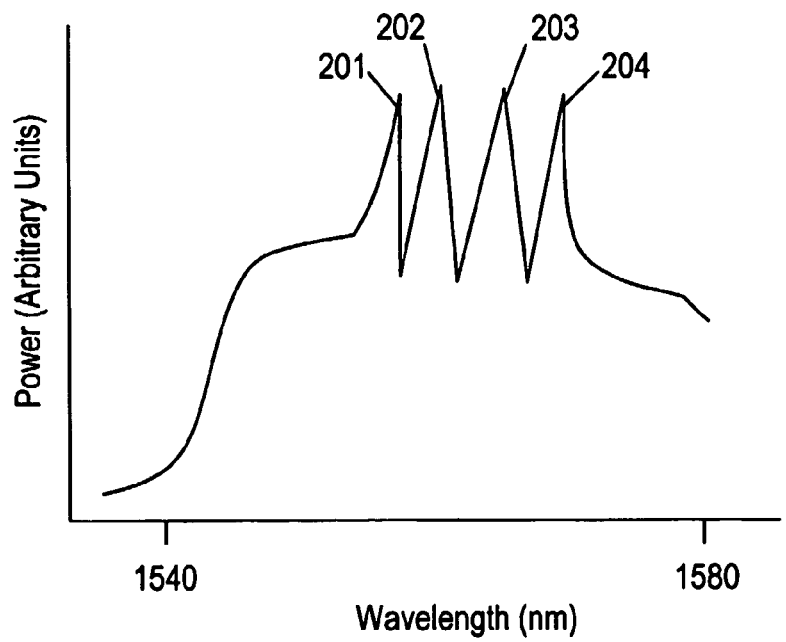
FIG. 2a is an output power spectrum for an arbitrary four channel DWDM system.
Figure 2B:
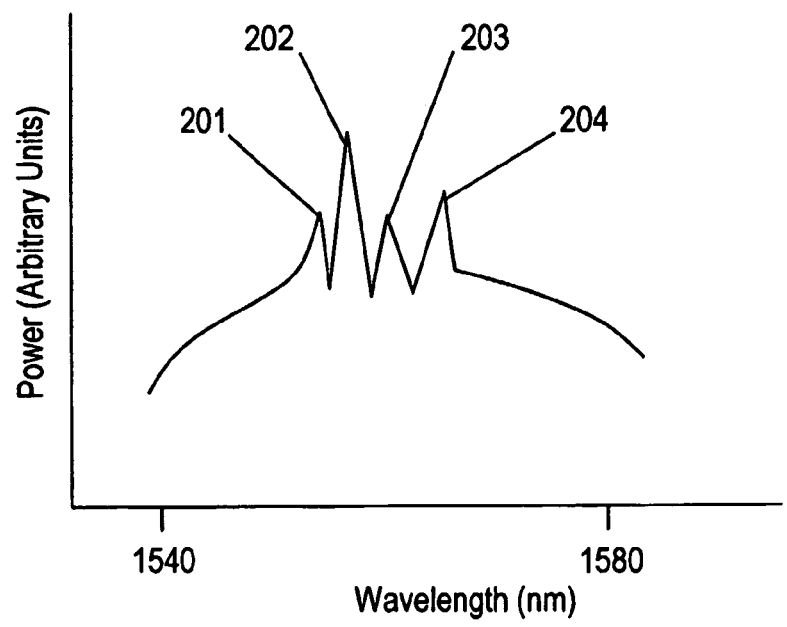
FIG. 2b is an output power spectrum for an arbitrary four channel DWDM system after say 2,000 kilometers with no pre-emphasis.
Figure 2C:
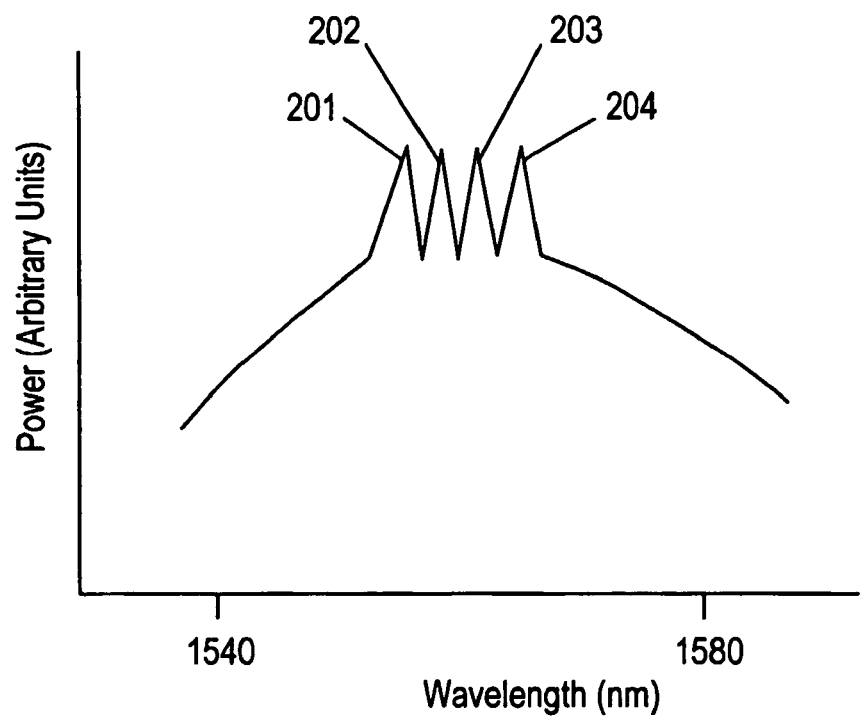
FIG. 2c is an output power spectrum for the arbitrary four channel after say 2,000 kilometers with pre-emphasis.

Referring now to FIGS. 2a to 2c, the power output spectrum for an arbitrary four channel DWDM system is shown. The figures show how pre-emphasis results in all channels being nominally equivalent. As shown in FIG. 2c, channels 1 to 4 (represented by reference numerals 201, 204, 203, and 204 respectively) appear to the receiver to be equal.

In older systems, where the level of gain flattening sophistication is lower, more attention to pre-emphasis will be required to overcome significant levels of non-flatness.

Figure 2D:
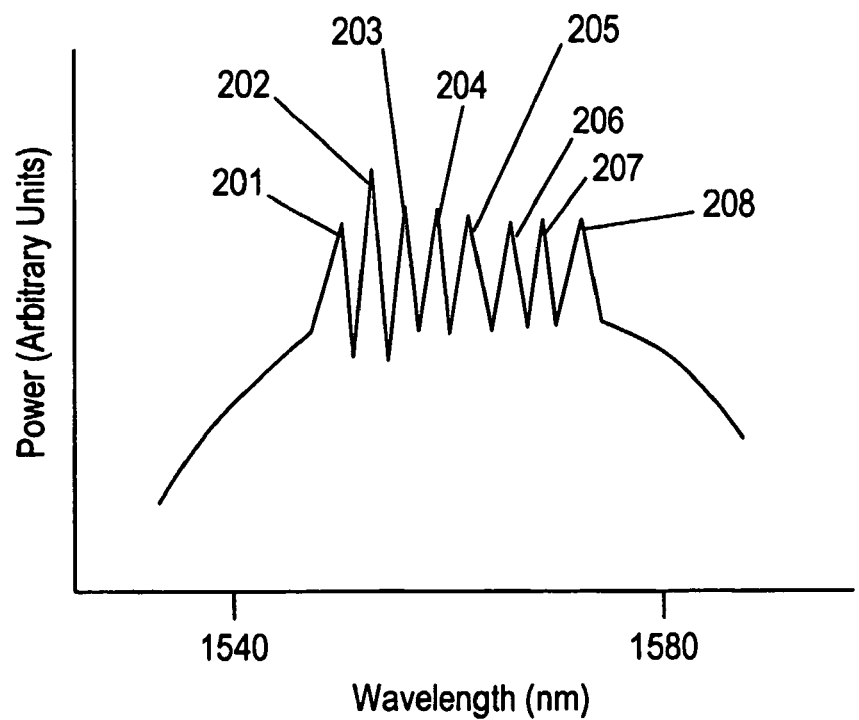
FIG. 2d is an output power spectrum for the four channel DWDM system of FIG. 1 showing additional channels available due to the exploitation of the margin according to the present invention and with pre-emphasis of best channel.
Figure 3:
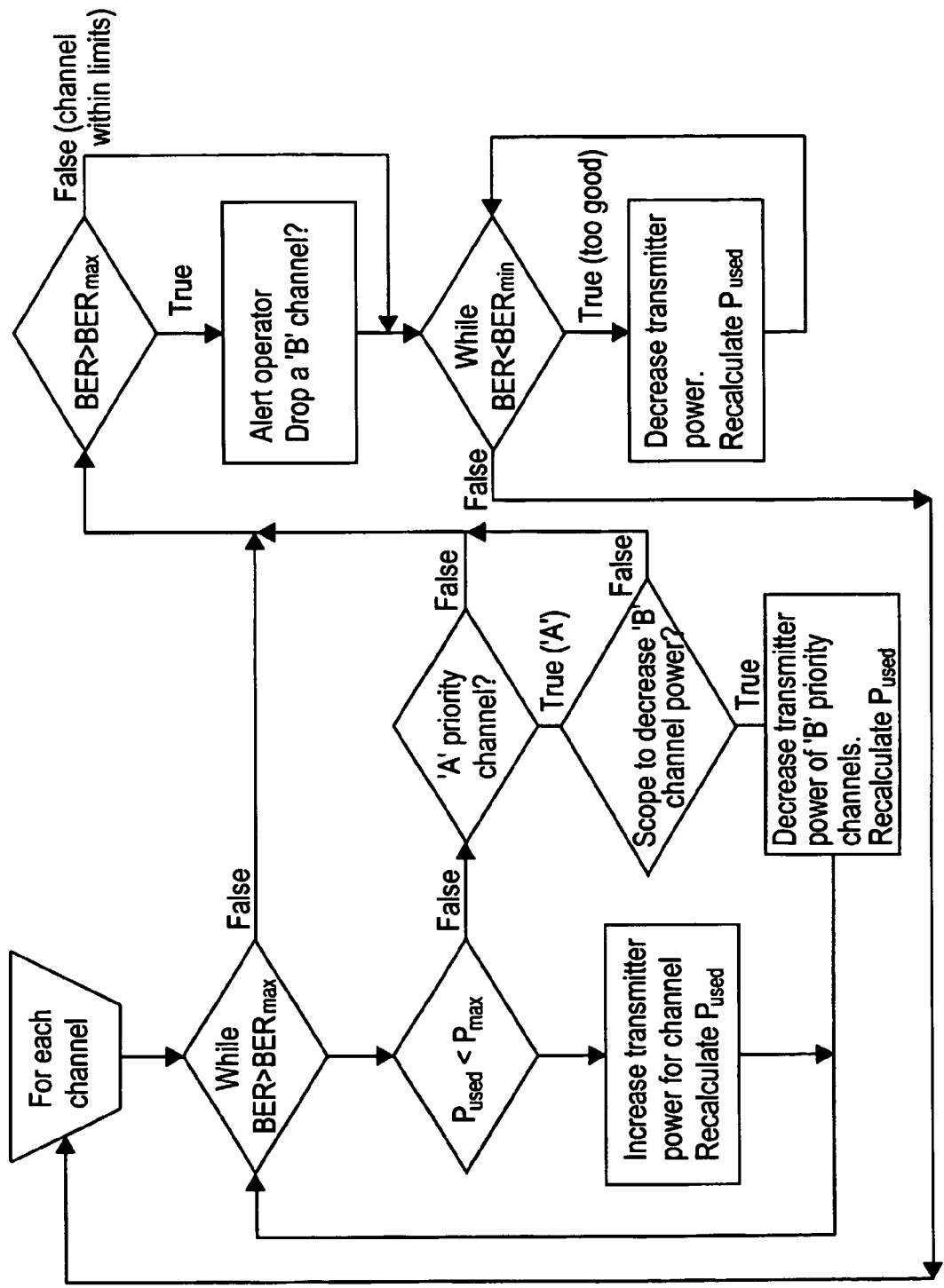
FIG. 3 is a representation of a control algorithm for adjusting power in the transmission system of FIG. 1 following withdrawal of low priority traffic.

Referring to FIG. 2d, the output spectrum for the four channel DWDM system of FIG. 1 after say 2,000 kilometers is shown. In this system, additional channels exists due to the exploitation of all available margins, for example, ageing, repair etc The system now has 8 channels 201 to 208. This system incorporates bias pre-emphasis on the channel that will carry the A class channel which in this case is channel 202. All other channels are nominally equal.

At the outset, a power budget is calculated for the system 10 and a maximum power $P_{max}$ is therefore calculated. Alternatively $P_{max}$ may be worked out empirically during system commissioning. At any time during transmission, the system will be operating at a particular power known as $P_{used}$, where $P_{max} > /P_{used}$ Data entering the system for transmission is encoded using an FEC encoder, and then decoded after transmission using an FEC decoder.

When using FEC coding it is possible to detect errors in each of the channels.

For each channel an acceptable maximum bit error rate, $ber_{max}$ is calculated. A controller 22 incorporating a control algorithm 24 responds to the measured ber on each channel and sets the output power setting according to the measured ber. Initially, an operator inputs into the controller details of target bit error rates.

As data enters the transmission system 10, it is categorised according to its priority. For example the data maybe categorised as higher priority for A class traffic and lower priority for B class traffic. However, the data maybe further subdivided into any number of different priority levels as appropriate.

The system will be set up so that high priority data is directed onto particular known channels. The operator will input details of channel properties into the controller 22.

If the ber increases on a particular channel, the output power of the transmitter on that channel may be increased to thereby reduce the ber. However, the combined output of all the transmitters in the system, $P_{used}$ must be less than or equal to $P_{max}$ which is the maximum power available according to the power budget.

Figure 4:
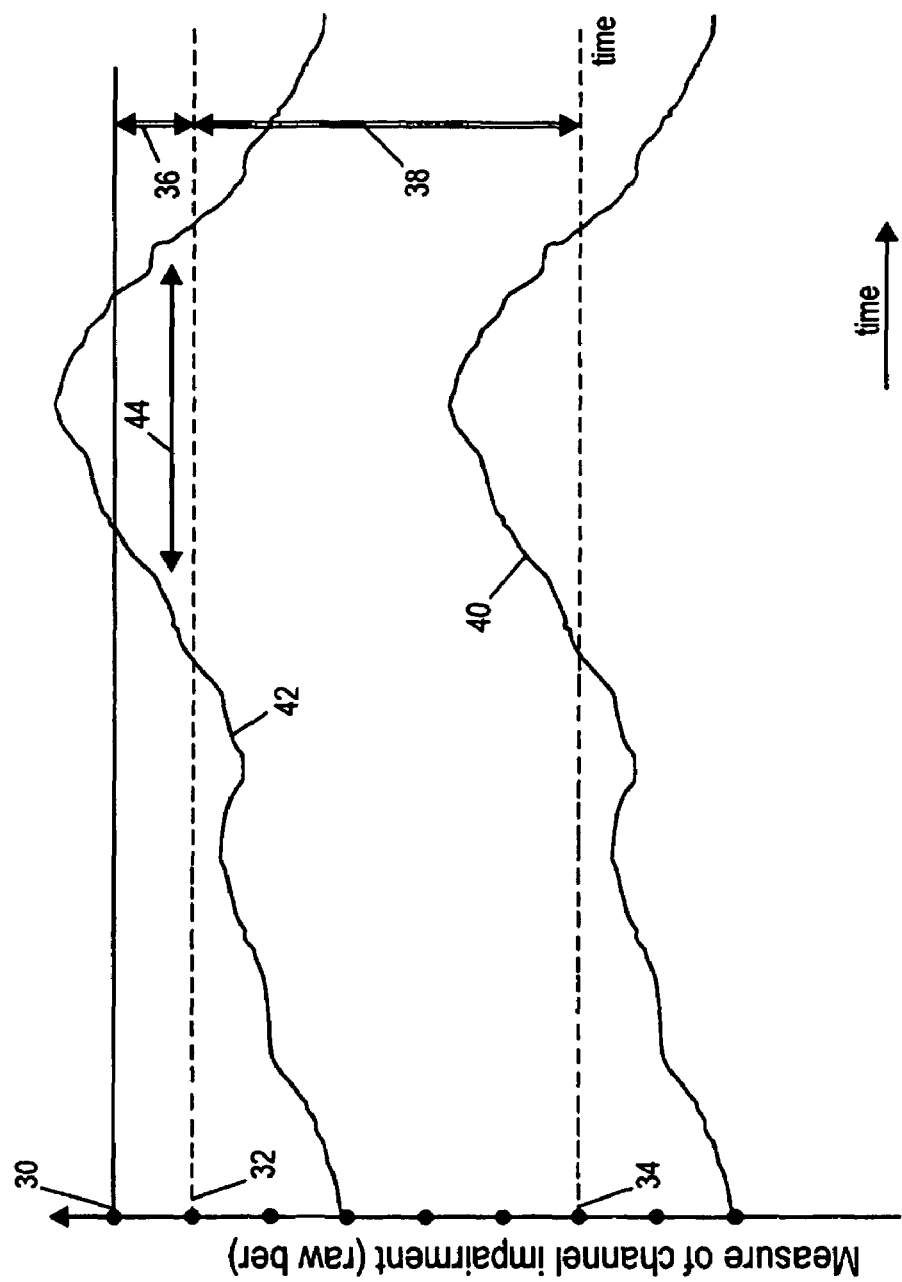
FIGS. 4, 5 and 6 are graphical representations showing how raw ber may be controlled by means of the present invention.
Figure 5:
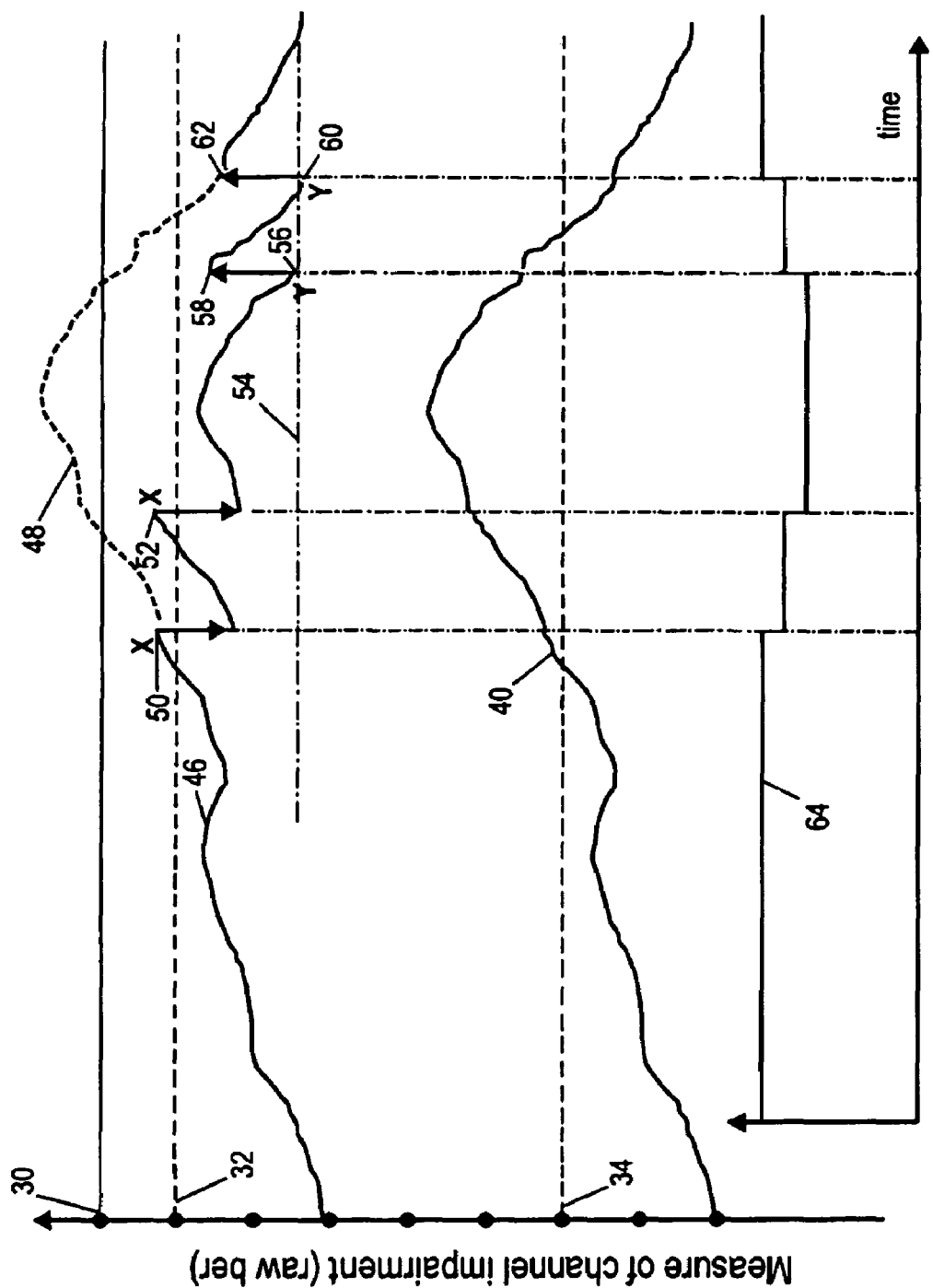
Figure 6:
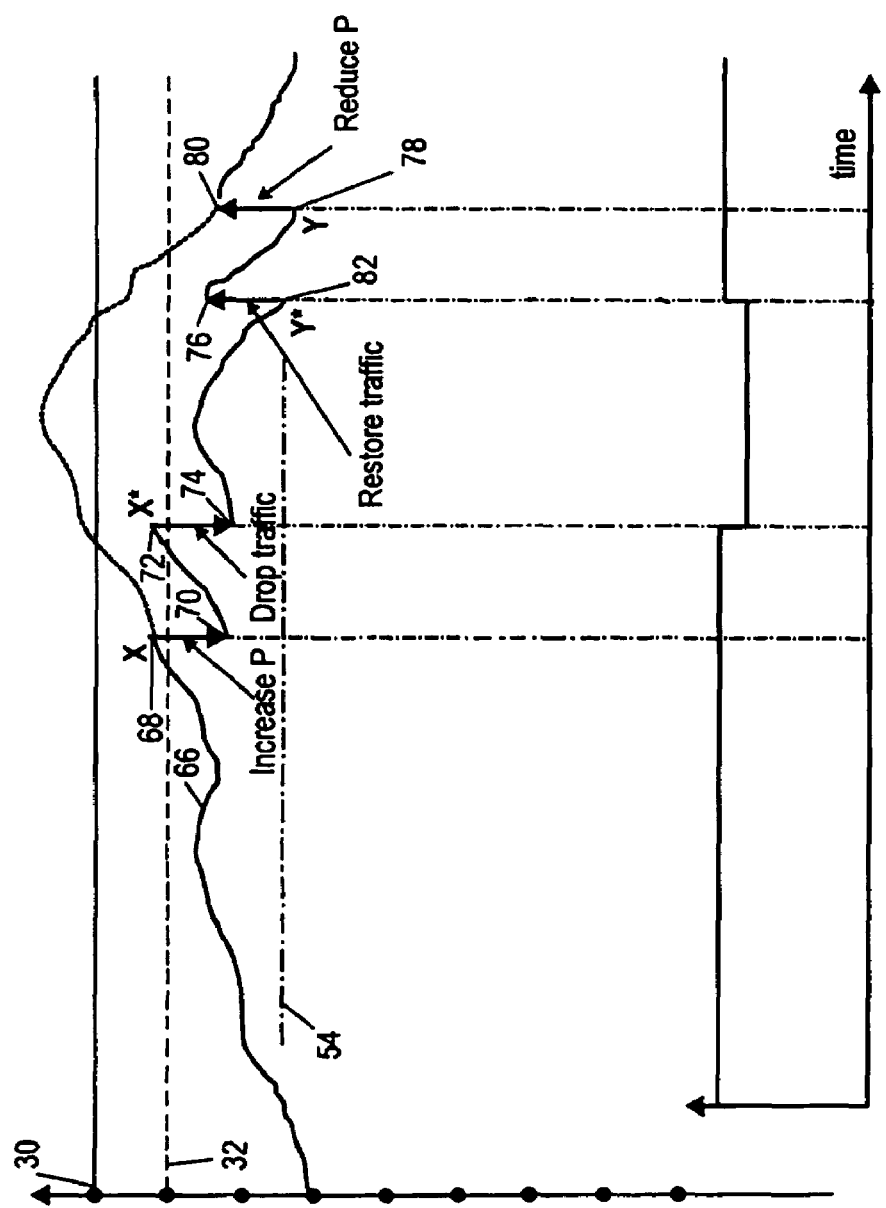

FIGS. 4, 5, and 6 show how channel impairment, or raw ber can vary with time, and how a system according to the present invention can manage the levels of raw ber. In each of these three figures time is expressed along the X axis and channel impairment in terms of raw ber is shown on a notional scale on the Y axis. Typically raw ber is measured on a decibel scale. The figures show variation of time exaggerated for clarity.

Each of the FIGS. 4, 5 and 6 shows the hypothetical level of channel impairment which can be tolerated by a system according to the present invention compared to a level of channel impairment that can be tolerated in a known transmission system.

Referring to FIG. 4, the curve representing channel impairment in a transmission system according to the present invention is designated by the reference numeral 42, and the curve indicating a maximum level of channel impairment available in a conventional transmission system is indicated by the reference numeral 40.

In conventional transmission systems, there is a conventional threshold 34 that a system is designed to operate below. This means that a system is designed so that under normal circumstances the channel impairment will not exceed this conventional threshold 34. However should circumstances dictate that the channel impairment increases above this level, for example because of ageing of the system, and the system will still function since a wide ageing margin has been built into the design of the known system.

Typically, the conventional threshold 34 is several dBs below the hard threshold 30. In practice, the conventional threshold 34 cannot be set in terms of some measured ber, but rather in terms of setting signal to noise ratio several dBs lower than the minimum for an acceptable ber.

By contrast, a transmission system according to the present invention is able to utilise this margin. An artificial threshold known as a soft threshold 32 is used when calculating the acceptable level of channel impairment that the transmission system can tolerate. The difference between the soft threshold 32 and the conventional threshold 34 is indicated by the line 38 and is known as the margin.

A third threshold is also identified, the hard threshold 30. In a transmission system according to the present invention, it is unacceptable for the channel impairment to rise above the hard threshold level.

If the level of channel impairment increases above the soft threshold 32 then it may not be possible for the system to carry all traffic being transmitted. Thus there is a period of time indicated by the line 44 when the transmission system according to the present invention has to react to the higher channel impairment level as will be explained in more detail herein below.

Turning now to FIG. 5, the two curves 40, 42 are again illustrated. FIG. 5, illustrates how a transmission system according to the present invention may react to a level of raw ber above the soft threshold 32.

Once the channel impairment rises above the soft threshold for example to point 50, the power to a particular channel carrying low priority data may be reduced or even switched off completely. This results in the traffic that had been carried by that channel being reduced or even completely eliminated. The reduction in traffic carried by the transmission system results in a reduction in the channel impairment which brings the raw ber to below the soft threshold level. In addition the power that had been used on the particular channel can be allocated to other channels, thus increasing the power on those channels. This in turn results in a reduction in channel impairment.

In the situation illustrated in FIGS. 4, 5 and 6, the channel impairment however continues to rise so that it again exceeds the soft threshold 32 at point 52. At this point, the transmission system according to the present invention again detects that the raw ber is unacceptably high and again reduces power from another channel preferably one also carrying low priority data. This further reduces the level of traffic transmitted by the system and increases power to the remaining channels. This action reduces the channel impairment to below the soft threshold level 32.

In the situation illustrated in FIGS. 4, 5 and 6, although the channel impairment increases slightly from this point it then begins to decrease to a point 56 which reaches a further threshold 54 known as $ber_{min}$. Once the channel impairment has reached the $ber_{min}$ threshold 54 the algorithm detects that this threshold has been reached and reintroduces some of the traffic that had previously been dropped. Consequently the level of channel impairment is increased to point 58. Point 58 is still below the soft threshold level 32, and channel impairment continues to fall to point 60 due to prevailing conditions. When this again hits the $ber_{min}$ threshold 54, the system increases the traffic on the other of the channels on which traffic had been dropped. Consequently the level of channel impairment increases to the point 62. At this point all dropped traffic has been reintroduced into the system and the transmission system can continue as normal.

Curve 64 shows the level of traffic being carried by the system at any given time.

Turning now to FIG. 6, curve 42 is again illustrated. In this case, when the channel impairment rises above the soft threshold 32 to point 68, the system increases the power to a particular channel which has the effect of reducing the channel impairment to below the soft threshold level to point 70. However in the situation illustrated the channel impairment continues to rise to point 72 which is again above the soft threshold level 32. In the illustrated example, the system has now reached its maximum available power ($P_{max}$), and therefore it is necessary for the system to reduce power in a particular channel in order to reduce the channel impairment to level 74. Eventually, the level of channel impairment hits the $ber_{min}$ threshold 54 at point 82 at which point power may be increased to the channel on which it was reduced in order to restore dropped traffic. This has the effect of increasing the channel impairment to the point indicated by the reference numeral 76. A further reduction in the channel impairment to point 78 which is again at the $ber_{min}$ threshold 54 allows the system to reduce the system power, increasing the channel impairment to point 80 which is still below the soft threshold level 32. At this point the transmission system has regained all dropped traffic and has returned to its original power level.

As can be seen with reference to FIG. 3 and FIGS. 4 to 6, the bit error rate for each channel is monitored by the transmission system according to the present invention. If the ber on a particular channel is greater than the $ber_{max}$ and $P_{used}$ is less than $P_{max}$ then the power of the transmitter on that channel is increased and $P_{used}$ is recalculated. If $P_{used}$ is greater than or equal to $P_{max}$ then the controller determines whether that channel is a priority channel. If it is a priority channel then transmitter power on a lower priority channel is decreased, and $P_{used}$ is recalculated. If on the other hand the channel is not a priority channel, then the operator is alerted and traffic can be dropped from a lower priority channel. The channel could be closed, thus allowing power on the other channels to be increased, or it may be adapted to carry additional FEC overhead, resulting in increased ber of one or more of the remaining channels. In either case, the flow diagram will determine whether or not this change has been sufficient to restore ber to below $ber_{max}$. It is also possible that ber is found to be below the threshold set at $ber_{min}$, in other words well below $ber_{max}$. In that case there is scope to reduce the power of the transmitter, to recalculate $P_{used}$, and possible to restore previously withdrawn traffic. This is also indicated within the flow diagram.

Figure 7:
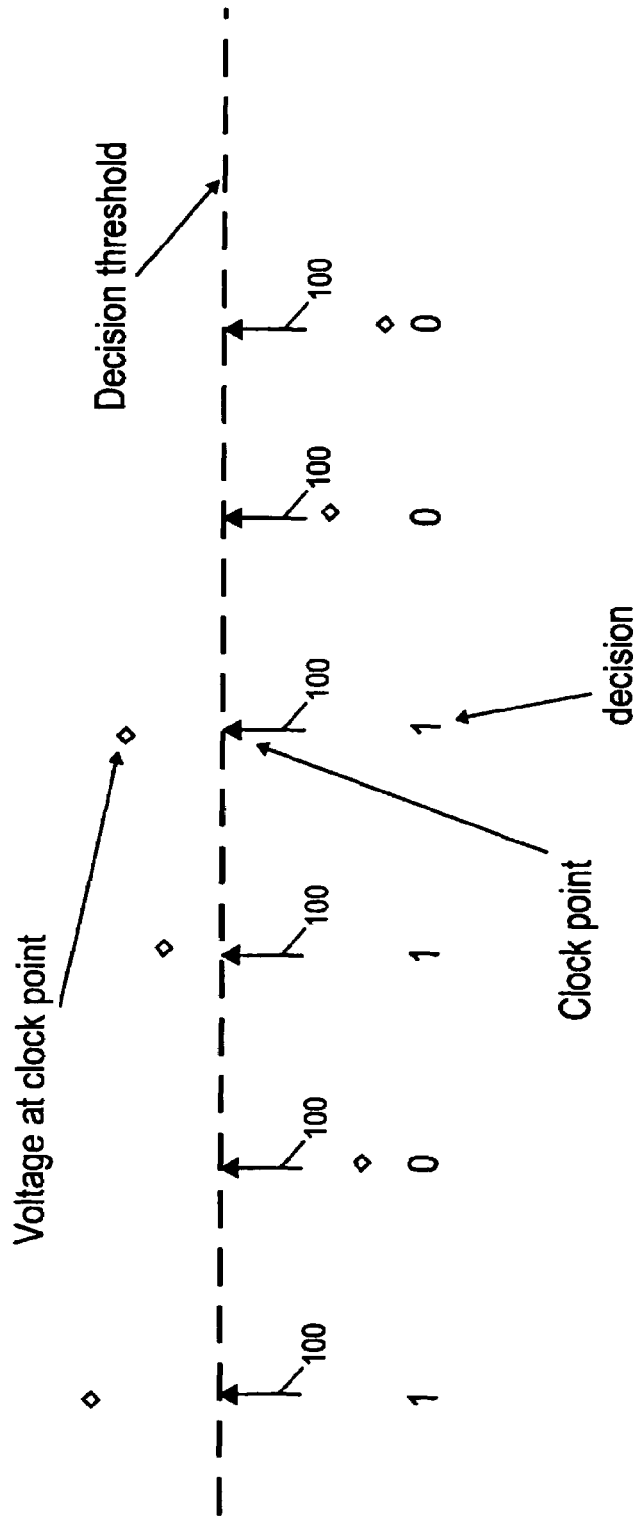

Raw ber or channel impairment may also be controlled using a four level soft decision circuit of the type illustrated in FIGS. 7 and 8. In a four level decision circuit, a clock is provided to mark out regular decision instances 100. At each instant 100 a decision is made between a 1, corresponding typically to the signal voltage being greater than the predetermined threshold and a 0 which corresponds to a voltage less than a threshold. In the four level decision circuit illustrated in FIGS. 6 and 7, further information can be provided to distinguish between clear decisions e.g those where a "1" corresponds to 1 volt above the threshold, and marginal decision for example when "1?" corresponds to signal above the threshold but less than one volt. The onset of occasional "1?" or "0?" results will give an indication of reducing margins before a significant increase in actual errors.

In the present situation such a four level soft decision circuit gives the algorithm forming part of the present invention added information compared to information obtained from hard decision circuits and allows the opportunity of correcting errors much earlier. The soft decision circuitry could be implemented by various methods. It is possible using such a circuit to accumulate the number of "definitely" and "probably" occurrences and calculate a Quality of Line performance figure. This could be used to indicate the amount of margin a particular system has before the transmission system would fail. An advantage of using such soft decision circuitry is that it is not reliant on the FEC circuitry. In addition it can operate at a much lower signal to noise ratios than the FEC circuitry.

The invention claimed is:

1. A wavelength division multiplexing transmission system, the system comprising:
   a plurality of channels at different wavelengths, each channel comprising a transmitter,
   a receiver, and one or more amplifiers,
   the system further comprising for each of the plurality of channels:
   an encoder for encoding data with a coding and;
   a decoder for decoding transmitted data;
   prioritizing means for prioritizing each channel according to the data carried on that channel and associating priority data with each channel;
   monitoring means for monitoring directly or indirectly raw uncorrected bit errors on each channel; and
   power adjusting means for varying the power on a channel in response to the bit error rate of that channel.

2. A transmission system according to claim 1 wherein each encoder is an FEC encoder.

3. A transmission system according to claim 1 wherein the monitoring means comprises a FEC error detection circuit.

4. A transmission system according to claim 1 wherein the monitoring means comprises a multi-level soft decision circuit.

5. A transmission system according to claim 1 further comprising a controller for controlling the power adjusting means.

6. A transmission system according to claim 5 wherein the controller comprises a control algorithm.

7. A transmission system according to claim 1 wherein the power adjusting means is further adapted to additionally switch off a channel when the channel carries low priority data.

8. A transmission system according to claim 1 further comprising means for pre-emphasizing a channel prior to transmission of data.

9. A method of managing data traffic transmitted via a wavelength division multiplexing transmission system comprising a plurality of channels at different wavelengths, the method comprising the steps of:
   allocating a priority to data to be transmitted;
   directing data to a predetermined channel in the transmission system according to the priority of the data;
   encoding the data prior to transmission using an encoder, and decoding the data after transmission using a decoder;
   monitoring directly or indirectly, raw uncorrected bit errors on each channel;
   adjusting the power to each channel in response to the monitored bit error rate and priority of the data of each channel.

10. A method according to claim 9 wherein the data is encoded with FEC coding.

11. A method according to claim 9 wherein the step of adjusting the power to each channel includes the step of reducing power to channels carrying low priority data, such that, if appropriate, a channel carrying low priority data is switched off.

12. A method according to claim 9 further comprising a first step of calculating the power budget of the system.

13. A method according to claim 9 further comprising a step of re-calculating the used power whenever power to a channel is adjusted.

* * * * *

UNITED STATES PATENT AND TRADEMARK OFFICE
CERTIFICATE OF CORRECTION

| | |
|---|---|
| PATENT NO. | : 7,526,205 B2 |
| APPLICATION NO. | : 10/510751 |
| DATED | : April 28, 2009 |
| INVENTOR(S) | : Martin Chown et al. |

It is certified that error appears in the above-identified patent and that said Letters Patent is hereby corrected as shown below:

On the title page, item (57), Abstract, line 43, after "for", delete --,--.

Specification, Col. 1, line 24, after "in the", change "in line" to --in-line--.

Specification, Col. 1, line 30, after "well", change "know" to --known--.

Specification, Col. 2, line 57, after "Advantageously", insert --,--.

Specification, Col. 2, line 57, after "comprises", change "a" to --an--.

Specification, Col. 2, line 61, after "either", change "a" to --an--.

Specification, Col. 4, line 19, after "apply a", change "mulit-level" to --multi-level--.

Specification, Col. 4, line 26, after "knowledge", insert --of--.

Specification, Col. 4, line 63, after "ber", insert --,--.

Specification, Col. 5, line 4, after "therefore", insert --,--.

Specification, Col. 5, line 12, after "Conversely", insert --,--.

Specification, Col. 5, line 15, after "traffic", insert --,--.

Specification, Col. 5, line 16, after "adversely", change "effect" to --affect--.

Specification, Col. 5, line 33, after "Alternatively", insert --,--.

Specification, Col. 5, line 58, after "appropriate", insert --,--.

Specification, Col. 6, line 20, after "channel", insert --DWDM system--.

Specification, Col. 6, line 43, after "comprises", change "inline" to --in-line--.

Specification, Col. 6, line 56, after "channels", change "exists" to --exist--.

Specification, Col. 6, line 58, after "etc", insert --.--.

Specification, Col. 6, line 67, change "$P_{max}>/P_{used}$" to --$P_{max} \geq P_{used}$--.

Specification, Col. 7, line 31, after "figures", insert --,--.

Specification, Col. 7, line 49, after "circumstances", insert --,--.

Specification, Col. 7, line 52, after "of the system,", delete "and".

Specification, Col. 8, line 29, after "impairment", insert --,--.

Specification, Col. 8, line 29, after "however", insert --,--.

UNITED STATES PATENT AND TRADEMARK OFFICE
CERTIFICATE OF CORRECTION

PATENT NO. : 7,526,205 B2
APPLICATION NO. : 10/510751
DATED : April 28, 2009
INVENTOR(S) : Martin Chown et al.

It is certified that error appears in the above-identified patent and that said Letters Patent is hereby corrected as shown below:

Specification, Col. 9, line 31, after "case", insert --,--.

Specification, Col. 9, line 32, after "and", change "possible" to --possibly--.

Specification, Col. 9, line 63, after "noise", change "ratios" to --ratio--.

Claim 3, Col. 10, line 21, after "comprises", change "a" to --an--.

Signed and Sealed this

Twenty-eighth Day of July, 2009

JOHN DOLL
*Acting Director of the United States Patent and Trademark Office*